Patented Nov. 4, 1941

2,261,757

UNITED STATES PATENT OFFICE 2,261,757

DEHALOGENATION OF HALOGENATED ETHYLENE POLYMERS

Eric William Fawcett, Northwich, England, assignor to Imperial Chemical Industries Limited, a corporation of Great Britain No Drawing. Application March 9, 1938, Serial No. 194,983. In Great Britain March 19, 1937

14 Claims. (Cl. 260—94)

This invention relates to the manufacture of new derivatives of polymers of ethylene.

In Patents 2,153,553 and 2,188,465, there are described methods of converting ethylene into new products consisting of normally solid polymers of ethylene or of semi-solid products containing a substantial proportion of said normally solid polymers. In my Patent 2,183,556 there are described methods whereby halogenated products of the said new polymers of ethylene can be obtained.

This invention has as an object to devise a method whereby a large number of new derivatives of the said polymers of ethylene may be obtained. A further object is to provide new derivatives of the said polymers of ethylene. A still further object is to provide new and useful compositions of matter. Further objects will appear hereinafter.

In practicing the invention the ethylene polymer is first halogenated as described in the above mentioned Patent 2,183,556 and the resulting halogen derivative is then reacted with a substance which under proper reaction conditions removes halogen from the polymer. By removal of halogen it must be understood that I do not merely mean the removal of the halogen alone but also its removal as hydrogen halide and as halogen compounds. The removal may or may not be accompanied by its replacement by other atoms or groups so that my method gives both a series of derivatives which are hydrocarbons and a series which are hydrocarbons carrying substituent groups. Within the scope of the term "dehalogenation" I mean to include the removal of halogen as such or in the form of halogen compounds, and also its replacement by other atoms or groups.

The ethylene polymers which are further treated in accordance with the practice of this invention are those made by the process described in either of the first two patents mentioned above. The process described in the first mentioned patent consists in subjecting ethylene to pressures in excess of 500 atmospheres under controlled elevated temperature conditions. This procedure results in various polymers of ethylene, the molecular weight of which varies depending particularly upon the pressure employed. By using pressures of more than 1000 atmospheres solid polymers of ethylene can be formed. Under these conditions the polymerization reaction takes place smoothly, requiring several hours for completion. Or the more rapid reaction described in the second mentioned patent may be used. In this method a definite but small quantity of oxygen which may be as little as 0.01% but preferably 0.03% to 0.10% at 1500 atmospheres, is included in the ethylene treated. The pressures are at least 500 atmospheres and preferably at least 1000 atmospheres and below 3000 atmospheres. The temperatures are between 100° C. and 400° C. and more desirably from 150° C. to 250° C. Thus, as a specific instance of obtaining the ethylene polymer, ethylene containing 0.05% oxygen is compressed in a steel bomb to a total pressure of 1500 atmospheres and heated rapidly to 210° C. whereupon a very sudden rise in pressure followed by a slow drop in pressure is observed. After five hours' heating at 210° C. the pressure is released and the product cooled. Under these conditions an 80% yield of the solid polymer, based on the ethylene used, is obtained.

The step of halogenation is carried out as disclosed in my afore-mentioned Patent 2,183,556. Thus, the halogenation may be effected by means of a halogenating material which may be the free halogens, or suitable halogenating compounds, optionally in the presence of halogen carriers such as iodine, aluminum chloride, or ferric chloride. Preferably the reaction is carried out on a solution or a suspension of the polymer in a medium which will not react with halogen or halogenating agents under halogenating conditions for ethylene polymers, for example acetic acid or carbon tetrachloride, chloroform, trichloroethylene, tetrachloroethane, etc. When the halogenation is carried out at room temperature the ethylene polymer is preferably suspended in an inert medium, e. g., carbon tetrachloride or acetic acid; but unless the time of reaction is unduly prolonged only up to some 20% of chlorine can conveniently be introduced by this procedure. At an elevated temperature, the reaction is much more rapid, although the actual rate depends to some extent on the solvent used, if one is used.

The following is an instance of suitable halogenation procedure: One hundred parts by weight of solid ethylene polymer are dissolved in the minimum amount of boiling carbon tetrachloride and the solution is cooled rapidly to room temperature. The fine suspension thus obtained is treated with 4.0 parts by weight of bromine in carbon tetrachloride solution, the bromine being added over a period of one hour in small quantities. The mixture is allowed to stand at room temperature for two hours. The reaction is then complete. The product is filtered off and dried. The brominated polymer is a white solid which softens at a temperature of about 110° C.

The next step, previously referred to, of removing the halogen from the halogenated polymer, which may contain for instance from 5% to 50% or more of the halogen, is further described in the following examples which are illustrative of methods for practicing the invention:

Example I

Polymerized ethylene having a molecular weight of about 4000 is brominated by the method outlined above to yield a material containing 24% by weight of bromine. The brominated polymer is mixed with an alcoholic ammonia soluiton, containing ammonia equivalent to half the bromine content of the polymer, and the mixture is heated with stirring to 150° C. in an autoclave for two hours.

The reaction product is added to water, and the solid product is washed with water until neutral. The polymer is then extracted with hot benzene (60° C.) to remove any unchanged brominated polymer and a little material containing primary amino groups formed by direct replacement of halogen by $NH_2$ group. The final product, the yield of which is 80–85% of the theoretical contains only a trace of bromine, is insoluble in boiling tetrahydronaphthalene, and softens at about 200° C. The original ethylene polymer was very soluble in hot tetrahydronaphthalene and softened at 100–110° C.

Example II

A brominated ethylene polymer containing about 15% by weight of bromine is treated in ether solution at 150° C. with an excess of pure zinc turnings (free from oxide) for 20 hours. After removing the excess of metal and inorganic salt, the polymer is separated into two fractions by extraction with tetrahydronaphthalene at 60° C. There are obtained a soluble fraction (40%) having physical properties similar to the original ethylene polymer and an insoluble fraction of high softening point, about 150°–160° C.

The above experiment was repeated using metallic sodium as the dehalogenating agent with analogous results.

Example III

Forty (40) grams of an ethylene polymer having a molecular weight of about 15000 and which had been chlorinated to 30% chlorine content was heated at 60° C. for 7–8 hours with 5 grams of $AlCl_3$ dissolved in 750 ccs. of benzene. The product obtained contains 90% of a practically infusible material of very low solubility, with a chlorine content of 3.2%; the remaining 10% is a dark viscous oil having the appearance of a heavy lubricating oil and a chlorine content of 3%.

A similar result is obtained, but with improvement in the color of the products by using carbon disulphide as a diluent.

Example IV

The initial material was an ethylene polymer having a molecular weight of about 15000 and which had been chlorinated to 55% chlorine content. This material was heated at 180° C. for 8 hours with ten times its weight of aniline. The product was poured into alcohol and the mixture filtered. There were obtained: (1) an infusible alcohol-insoluble fraction containing 7% chlorine and 8% nitrogen; (2) by making the filtrate alkaline with KOH and steam distillation, a residue which was a low-melting solid containing 17% chlorine and 7% nitrogen.

Extraction of the low melting solid with $CCl_4$ yields a small quantity of unsaturated oil.

Example V

Ten (10) grams of chlorinated (31% chlorine) ethylene polymer (molecular weight of initial polymer about 15000) are refluxed for 30 hours with 25 ccs. of piperidine and 150 ccs. of xylene. Piperidine hydrochloride is precipitated and removed by filtration. The hot filtrate is poured into ethyl alcohol, when a soft rubber-like product separates out, containing 19% chlorine, and no nitrogen and of softening point about 95° C. It shows the reactions of an unsaturated compound.

Example VI

The initial material is an ethylene polymer having a molecular weight of about 15000 and which had been chlorinated to 8% chlorine. It was heated for 20 hours at 100° C. with 10 times its weight of pyridine. There was a gradual formation of a precipitate, viz. a soft rubber-like material of low solubility, containing 7.5% of chlorine and no nitrogen, and of softening point about 95° C.

By methods similar to those outlined above reaction of a chlorinated polymer with a solution of sodium ethylate (NaOEt) in xylene results in complete dehalogenation and the production of a product having an insoluble fraction and a soluble fraction; the latter is partly unsaturated.

The dehalogenation may be partial or substantially complete and may be carried out in various ways, thus by the use of halogen removing reagents such as ammonia, sodium polysulphides, metals such as zinc or sodium in a suitable medium (e. g. ether), amines, metal alcoholates, e. g. sodium ethylate, metal halides (e. g. aluminum chloride), or caustic alkalis, the aforesaid reagents being merely a few typical examples from the numerous reagents available for the purpose; or dehalogenation may be effected by heating the halogenated polymer under appropriate conditions. The invention is intended to cover any and all methods of effecting halogen removal, as defined above.

Two classes of products obtainable according to this invention are of particular interest.

In one type of dehalogenation, an effect is obtained which is believed to be that of halogen removal between two or more molecules of the polymer in such a way as to form a linkage between the said polymer molecules. These linkages may be simple carbon-carbon bonds, or via an intermediate group such as -NH-, -O-, -S-, $$-\overset{O}{\underset{\|}{C}}-$$

-$C_6H_4$-, -NH.CO.NH-, -NH.$CH_2$.$CH_2$.NH-,

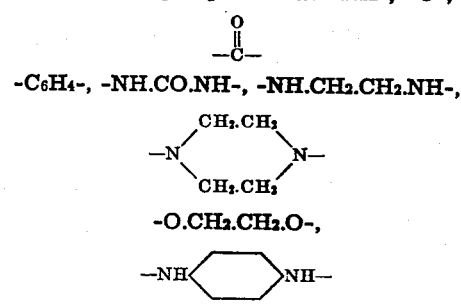

-O.$CH_2$.$CH_2$.O-,

—NH⟨⟩NH—

In this way, not only is the product of higher molecular weight than the initial polymer, but there is also an important structural change, the original simple long chain structure being converted to a bridged structure containing two or more long chains. The invention is not, of course, dependent upon the above theory being the correct one; the theory is merely presented as a likely one accounting for the observed changes in properties and characteristics. Control of the physical properties of these "bridged structure" products is possible because the number of bridged links is directly controlled by the number of halogen atoms available for removal, i. e., the number introduced in the halogenation stage. Further control of physical and chemical properties, is available by the extent of dehalogenation and by a suitable choice of dehalogenating reagent whereby it is possible to introduce a variety of reactive chemical groupings into the polymer molecules. Further chemical modification is then possible by reaction with these groups.

In another type of dehalogenation, halogen, or more correctly hydrogen halide is apparently removed from a single chain, resulting in the formation of additional unsaturated bonds in the chain according to the number of HCl molecules removed. Control of the physical properties of the products is again attainable by choice of starting material, extent of dehydrohalogenation, and by the choice of dehydrohalogenating agent.

For the production of unsaturated compounds I prefer to use caustic alkalis or organic secondary bases, but useful results are also obtained employing other dehydrohalogenating agents well known to those skilled in the art.

Products can be prepared in accordance with the processes of this invention having softening points of at least 150° C. and are characterized by being less soluble in the common organic solvents than the original ethylene polymers from which they are derived.

As described in said Patent 2,183,556, halogenation of the ethylene polymers of Patents 2,153,553 and 2,188,465 brings about certain changes of properties and characteristics. In general, the softening temperature is raised and the solubility is decreased as a result of halogenation, but the nature of the initial polymer may also be changed, viz., from a tough, hornlike material to a more rubber-like material or a brittle, resin-like material.

Dehalogenation of the halogenated polymer produces further changes, resulting in an end product which is generally markedly different from either the initial ethylene polymer or the halogenated polymer.

This process is a valuable advance in the art by which I have prepared products exhibiting a wide range of properties and characteristics and providing products which will be useful for further advances.

The products of this invention, like the ethylene polymers from which they are derived, are capable of being formed into filaments or threads which when cold drawn (drawn at temperatures below the melting point of the polymer) are transformed into fibers which under X-ray examination exhibit molecular orientation along the fiber axis and which exhibit the physical properties of spinnable textile fibers. But because of their higher melting points and lower solubility the fibers obtained from the new polymer derivatives described herein are more valuable in the textile art. The new compounds described herein are also useful in the preparation of foils, tapes, ribbons and the like, and are also valuable in the manufacture of molding and coating compositions.

As many apparently widely different embodiments of this invention may be made without departing from the spirit and scope thereof, it is to be understood that I do not limit myself to the specific embodiments thereof except as defined in the appended claims.

I claim:

1. A process which comprises at least partially dehalogenating a halogenated substance of the class which consists of halogenated polymers of ethylene which are normally solid and halogenated polymers of ethylene which are normally semi-solid.

2. A process which comprises removing halogen from a halogenated substance of the class which consists of halogenated polymers of ethylene which are normally solid and halogenated polymers of ethylene which are normally semi-solid, and isolating the resulting product.

3. A process which comprises dehydrohalogenating a halogenated substance of the class which consists of halogenated polymers of ethylene which are normally solid and halogenated polymers of ethylene which are normally semi-solid.

4. A process which comprises at least partially dehalogenating a halogenated substance of the class which consists of halogenated polymers of ethylene which are normally solid and halogenated polymers of ethylene which are normally semi-solid by treatment with a dehalogenating agent.

5. A process which comprises at least partially dehalogenating a halogenated substance of the class which consists of halogenated polymers of ethylene which are normally solid and halogenated polymers of ethylene which are normally semi-solid containing at least 5% by weight of halogen.

6. As new compositions of matter, the products resulting from the at least partial dehalogenation of a halogenated substance obtained by halogenating an ethylene polymer of the class consisting of preformed polymers of ethylene which are normally solid and preformed polymers of ethylene which are normally semi-solid.

7. As new compositions of matter, products of melting point at least 150° C., which are substantially insoluble in hot tetrahydronaphthalene, and which are obtained from the at least partial dehalogenation of a halogenated substance obtained by halogenating an ethylene polymer of the class consisting of preformed polymers of ethylene which are normally solid and preformed polymers of ethylene which are normally semi-solid.

8. A synthetic fiber comprising essentially the composition defined in claim 6.

9. The process set forth in claim 4 in which said dehalogenating agent is caustic alkali.

10. The process set forth in claim 4 in which said dehalogenating agent is zinc.

11. The process set forth in claim 4 in which said dehalogenating agent is an amine.

12. As new compositions of matter the products resulting from at least partial dechlorination of a chlorinated substance obtained by chlorinating a preformed polymer of ethylene which is normally solid.

13. As new compositions of matter the products resulting from at least partial dechlorination of a chlorinated substance obtained by chlorinating a preformed polymer of ethylene which is normally semi-solid.

14. As new compositions of matter the products resulting from at least partial debromination of a brominated substance obtained by brominating a preformed polymer of ethylene which is normally solid.

ERIC WILLIAM FAWCETT.